United States Patent [19]
Pacini et al.

[11] 3,739,649
[45] June 19, 1973

[54] LINEAR POSITION CONVERTER

[75] Inventors: Elmo J. Pacini, Sudbury, Mass.;
Alford H. Johnson, Pittsford, N.Y.;
Robert B. Turner, Jr., Needham, Mass.

[73] Assignee: CSI Liquidating Corporation, Boston, Mass.

[22] Filed: Oct. 20, 1970

[21] Appl. No.: 82,403

[52] U.S. Cl. .............................................. 74/89.22
[51] Int. Cl. ............................................ F16h 27/02
[58] Field of Search .................... 74/89.22, 230.16, 74/89.2; 310/75, 69; 320/72

[56] References Cited
UNITED STATES PATENTS

| | | | |
|---|---|---|---|
| 463,872 | 11/1891 | Reese | 74/89.2 |
| 1,247,352 | 11/1917 | Waybright | 74/89.2 |
| 1,263,404 | 4/1918 | Green | 74/89.2 |
| 2,491,341 | 12/1949 | Tillman | 74/89.22 |
| 2,884,788 | 5/1959 | Clark | 74/89.22 |
| 707,685 | 8/1902 | Fay | 74/230.16 |
| 3,059,486 | 10/1962 | Wubbe | 74/89.22 |
| 377,281 | 1/1888 | Welch | 74/230.16 |

*Primary Examiner*—Charles J. Myhre
*Assistant Examiner*—Wesley S. Ratliff, Jr.
*Attorney*—Iandiorio & Grodberg

[57] ABSTRACT

A linear position encoder including a spool adapted for connection with a rotary transducer and having guide means about its periphery, means for mounting the spool and transducer to one of two rectilinearly, relatively movable members, first and second spaced support means mounted on the other of the two relatively movable members; and a wire tautly held between the first and second spaced support means and looped about the spool within the guide means for converting rectilinear relative motion between the spool and wire to rotary motion of the spool for driving the rotary transducer.

2 Claims, 8 Drawing Figures

ROBERT B. TURNER, Jr.
ELMO J. PACINI
ALFORD H. JOHNSON
INVENTORS.

BY
Joseph S. Iandiorio
ATTORNEY.

ROBERT B. TURNER, Jr.
ELMO J. PACINI
ALFORD H. JOHNSON
INVENTORS.

BY

Joseph S. Iandiorio
ATTORNEY.

ROBERT B. TURNER, Jr.
ELMO J. PACINI
ALFORD H. JOHNSON
INVENTORS.

BY

*Joseph S. Jandiorio*

ATTORNEY.

LINEAR POSITION CONVERTER

FIELD OF INVENTION

This invention relates to a linear position encoder utilizing a taut wire looped about a spool for driving a rotary transducer for measuring the rectilinear relative motion between two members, one of which supports the wire and the other of which supports the spool and transducer, and more particularly to such an encoder having means for guiding the wire to track over a repeatable path on the spool and for accommodating the inherent lateral displacement of the wire resulting from the loop.

BACKGROUND OF INVENTION

There are a number of conventional linear position measuring devices available for measuring the rectilinear relative motion between parts of machine tools and like equipment. Rack and pinion gears are used which convert linear movement to rotary motion which is converted to digital output using a rotary pulse generator. The rack and pinion equipment is very expensive, is subject to backlash error and is difficult to install on the machine whose motion is to be measured. Linear encoders with scribed or printed lines on a glass or metal scale are used with a reading head which provides digital pulse outputs as a function of relative motion of the lines. But these linear encoders are approximately three times more expensive than rack and pinion equipment. And although such linear encoders are quite accurate, a great deal of care must be taken during installation to properly mechanically align the parts. Tape measure encoders use a metal tape fastened at one end and looped partially around a precision drum mechanism and coiled about a take-up reel on the other end driven by a negator spring. The drum is coupled to a rotary pulse generator whose output is digital pulses. The tape measure approach is less expensive than the rack and pinion approach but the maximum accuracy achieved over extended distances is insufficient for most applications.

The technique of using a wire looped about a spool coupled to a rotary transducer has never been applied to the machinery industry because of the high precision requirements in measurements relating to machine tools. A typical error source in such devices is the inability of the device to accommodate the helix angle of the wire established by the loop about the spool or pulley; also the crowding or overlapping of the wire at the loop in narrow channel pulleys, and the drifting of the loop axially along a cylindrical spool as the loop travels along the wire, each contributes to a lack of repeatability in the wire path over the spool or pulley.

SUMMARY OF INVENTION

It is therefore an object of this invention to provide a simple, inexpensive, compact but high precision linear position encoder, using the technique of a taut wire looped about a spool for driving a rotary encoder, which may be simply, inexpensively and quickly installed.

It is a further object of this invention to provide such an encoder which provides means for easily achieving the correct wire length and tension and adjusting the spool diameter for quick, precise calibration.

It is a further object of this invention to provide such an encoder which provides means for accommodating the inherent lateral displacement produced by the loop about the spool.

It is a further object of this invention to provide such an encoder which has means for establishing a repeatable path over which the wire can move on the spool as the loop travels along the wire.

It is a further object of this invention to provide such an encoder which provides compensation for changes in the machine dimensions due to temperature variations.

This invention features a linear position encoder including an adjustable diameter spool adapted for connection with a rotary transducer and having guide means about its periphery, means for mounting the spool and transducer to one of two rectilinearly relatively movable members, first and second spaced support means mounted on the other of the two relatively movable members, and a wire tautly held between the first and second spaced support means and looped about the spool within the guide means for converting rectilinear relative motion between the spool and wire to rotary motion of the spool for driving the rotary transducer.

DISCLOSURE OF PREFERRED EMBODIMENT

Other objects, features and advantages will occur from the following description of a preferred embodiment and the accompanying drawings, in which.

Figure 1:
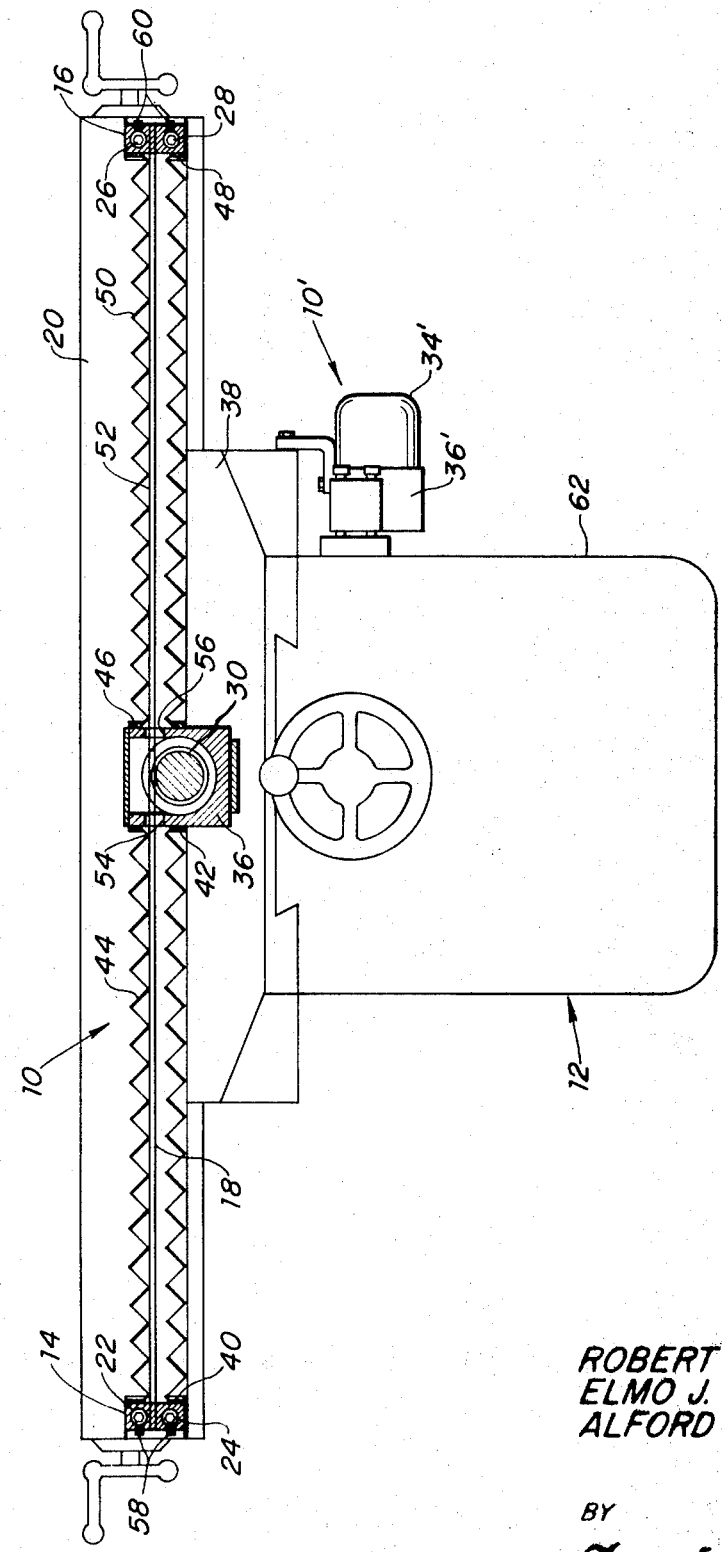
FIG. 1 is a diagrammatic front, sectional elevational view of a first linear position converter according to this invention mounted on a vertical milling machine only a portion of which is shown in front elevation and an end view of a second identical linear position encoder according to this invention mounted in another position on the same milling machine.
Figure 2:
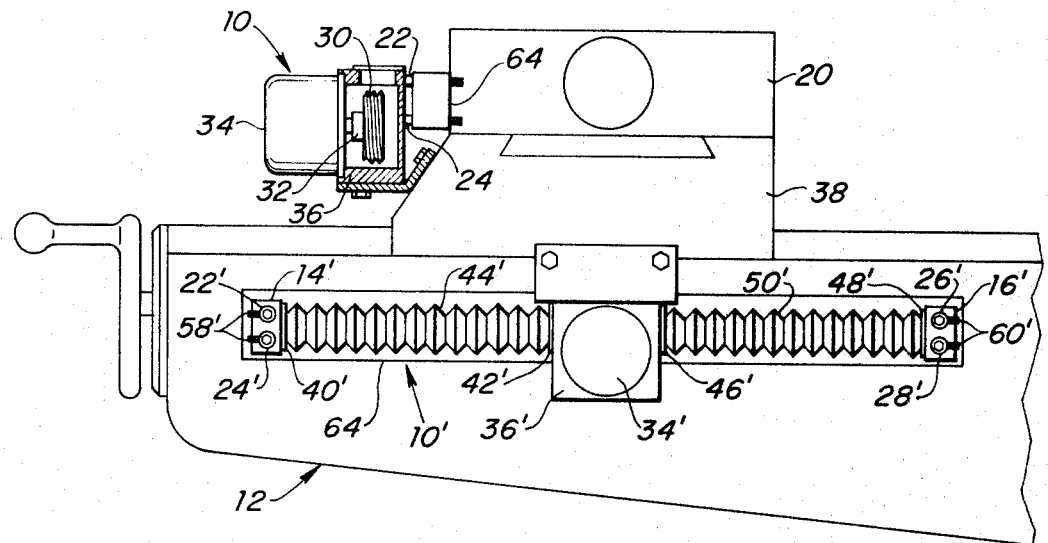
FIG. 2 is a diagrammatic, front sectional elevational view of the second linear position converter of FIG. 1 according to this invention mounted on the machine of FIG. 1 show in side elevation and an end view of the first linear position encoder.

The invention may be embodied in a linear position encoder 10, FIGS. 1 and 2, mounted on a vertical milling machine 12 wherein the end plates 14, 16 which support the wire 18 are connected directly to the table 20 by means of socket head shoulder bolts 22, 24 and 26, 28. Wire 18 is loaded to about 4 lbs. of tension after it is looped about spool 30 fastened by shaft 32 to rotary pulse generator 34 mounted on housing 36 which in turn is mounted to saddle 38 on which slides table 20.

Retaining rings 40, 42 secure bellows 44 to end plate 14 and housing 36 and retaining rings 46, 48 secure bellows 50 to housing 36 and end plate 16. Support cable 52, also supported by end plates 14, 16 is provided to prevent bellows 44, 50 from collapsing on wire 18. Both cable 52 and wire 18 pass through bores 54, 56 in housing 36. End plates 14 and 16 each contain set screws 58, 60 to set the position of the end plates on their respective shoulder bolts.

A second encoder 10' is also shown in FIGS. 1 and 2 with the housing 36' mounted on the saddle 38 and the end plates 14', 16' mounted on base plate 64 on the knee 62 of the machine 12. Thus, encoder 10' has its end plates 14', 16' fixed and the housing 36' moves, whereas encoder 10 has its end plates 14, 16 movable and housing 36 is fixed.

In operation, FIGS. 1 and 2, as table 20 moves relative to saddle 38, wire 18 anchored to table 20 by plates 14, 16 moves with table 20 and the loop of wire 18 rotates spool 30 connected to converter 34 fixed to saddle 38 causing an output from converter 34 representative of the motion of table 20. Similarly, as saddle 38 moves relative to knee 62, spool 30' moves with converter 34' fixed to saddle 38 causing spool 30' to be rotated by the loop of wire 18' whose ends are anchored at plates 14', 16' mounted on base plate 64 fixed to knee 62.

Figure 3:
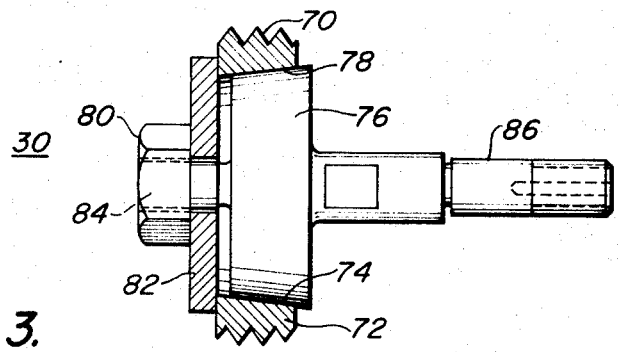
FIG. 3 is a side, elevational, sectional view of a preferred adjustable spool for use in the linear position encoders of FIGS. 1 and 2.

In preferred embodiments, spool 30 has for its guide means for the loop of wire 18 a helical thread 70 on the circumferential periphery of an annular member 72, FIG. 3, having a tapered internal bore 74. Plug 76 having a tapered external surface 78 fits into bore 74 and is drawn into bore 74 by the pressure of nut 80 against washer 82 as nut 80 is tightened on the threaded shaft 84 extending from plug 76. As nut 80 is tightened, plug 76 is drawn into annular member 72 increasing its diameter and as nut 80 is loosened, plug 76 is backed out of bore 74 decreasing the diameter of annular member 72. In this manner, the circumference of the thread 70 may be varied to calibrate the encoder. A shaft 86 which may be integral with plug 76 is used to drive pulse generator 34.

Figure 4:
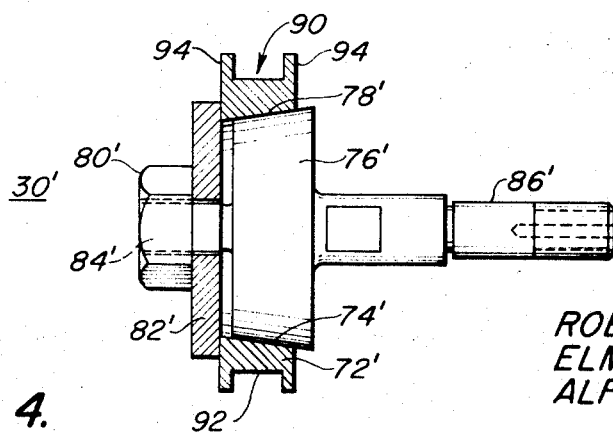
FIG. 4 is a side, elevational, sectional view of another adjustable spool for use in the linear position encoders of FIGS. 1 and 2.

In other embodiments, the thread 70 may be eliminated and limit guides used, such as a channel 90 formed by the smooth cylindrical surface 92, shown in FIG. 4, and circumferential walls 94. In FIG. 4, the spool 30' is identical to spool 30 in FIG. 3, but for the use of channel 90 in place of threads 70 and like parts have been given like reference numerals primed. Preferably, the distance between walls 94 is approximately equal to: $(n+1)(d)$ where $n$ is the number of times wire 18 is looped about spool 30 and $d$ is the diameter of wire 18.

Figure 5:
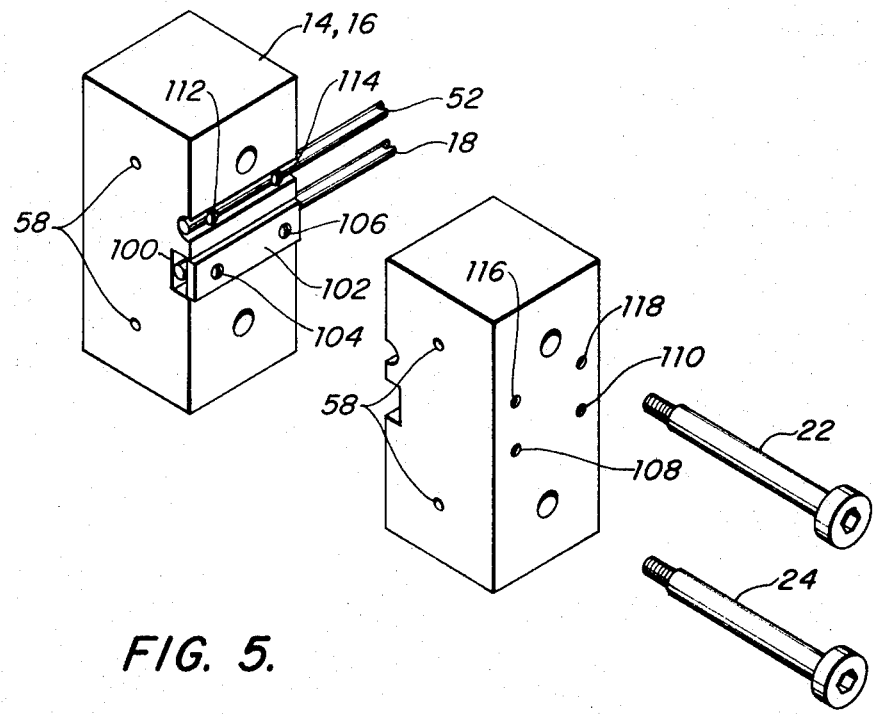
FIG. 5 is an axonometric view of an end plate of the encoder used to anchor the end of the wire and accommodate for lateral displacement.

Either one or both of end plates 14, 16 may contain a notch 100, FIG. 5, in which is fastened a pressure plate 102 to be tightened to anchor wire 18 by means of screws 104, 106 accessible through and threadably engaged with threaded holes 108, 110. Support cable 52 is similarly fastened by means of screws 112, 114 accessible through and threadably engaged with threaded holes 116, 118.

Figure 7:
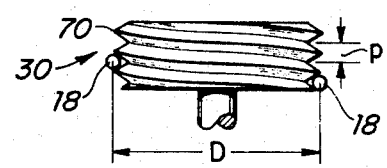
FIG. 7 is an enlarged top view of the spool in FIGS. 3 and 6 showing particular dimensions of that spool.

The inherent lateral displacement of wire 18 which occurs with threaded spool 30, FIG. 3, is a function of the helix angle $\theta$ of the threads 70, the mean thread diameter D and the pitch $p$, FIG. 7.

Figure 6:
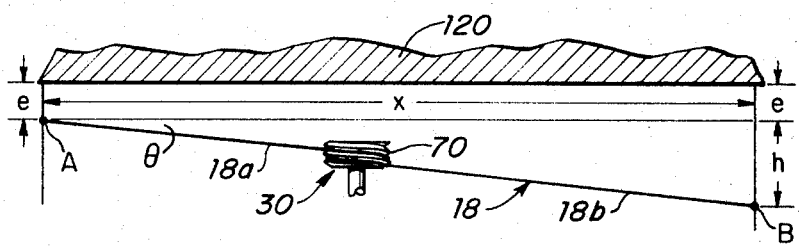
FIG. 6 is a schematic plan view of a linear position encoder according to this invention demonstrating a method of accommodation for lateral displacement of the wire in apparatus using threaded spools as shown in FIG. 3.

The source of this displacement is shown in FIG. 6 wherein one end A of wire 18 is anchored at some known distance $e$ from a reference 120. To prevent crawling, bending or other lateral stresses on the wire 18, the left half 18a of wire 18 should be parallel with the threads 70 and with the right half 18b. To accomplish this, the other end B of wire 18 must therefore be placed a distance $h$, plus $e$, from reference 120; that is, offset the distance $h$ from the end A. Since the wire is effectively, laterally displaced by a distance equal to the pitch $p$, FIG. 7, once each revolution $r$ of the spool 30, the distance h is determined by the number of revolutions $r$ spool 30 makes over the distance $x$ between ends A and B. The circumference of the loop is $\pi D$ where D is the mean loop diameter, FIG. 7, and so the number of revolutions $r$ equals $x/\pi D$ and the distance $h$ equals $x/\pi D \cdot p$. This expression defines $h$ when there is one loop about spool 30. The generalized expression which includes systems using more than one loop as well is $h = x/\pi D \cdot p + [(n-1)p]$ where $n$ is the total number of loops.

This lateral displacement is accommodated by the adjustable end plates 14, 16 whose positions may be varied by means of bolts 22, 24, 26, 28 and set screws 58, 60.

Figure 8:
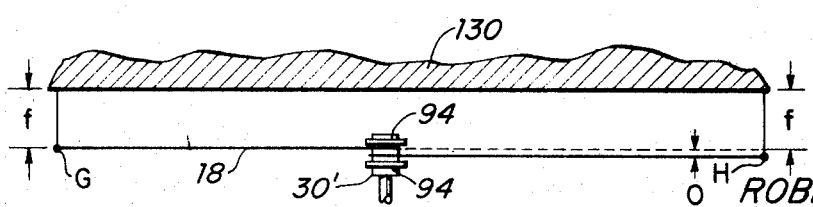
FIG. 8 is a schematic plan view of a linear position encoder according to this invention demonstrating a method of accommodation for lateral displacement of the wire in apparatus using spools as shown in FIG. 4.

In contrast, the lateral displacement which occurs with spool 30', FIG. 4, is a result of the fact that the two ends of the wire are displaced by an amount equal to the diameter $d$ of the wire for each loop about spool 30' because of the side by side relationship of the wire where it overlaps at the loop about the spool 30'. Thus, in FIG. 8, where end G of the wire 18 is fastened, the distance $f$ from reference 130, the other end H of wire 18 is fastened at the distance $f + O$ from reference 130. The displacement distance O is equal to $dn$ where $d$ is the diameter of wire 18 and $n$ is the number of loops about spool 30'. The displacement O is accommodated by the use of adjustable end plates 14, 16 as explained with reference to FIGS. 6 and 7 to prevent lateral forces on the wire 18 at the loop from causing the wire to lap over itself or crawl laterally on the spool.

Other embodiments will occur to those skilled in the art and are within the following claims:

What is claimed is:

1. A linear position encoder comprising:
a spool adapted for connection with a rotary transducer and having wire-confining guide means about its periphery;
means for mounting the spool and transducer to one of two rectilinearly, relatively movable members;
first and second spaced support means mounted on the other of the two relatively movable members;
a length of wire tautly held at its opposite ends by said first and second spaced support means, respectively, and looped spirally at least one full time about the periphery of said spool within said guide means for converting rectilinear relative motion between said spool and said wire to rotary motion of said spool for driving said rotary transducer; said rotary transducer including a rotary pulse generator.

2. A linear position encoder comprising:
a spool adapted for connection with a rotary transducer and having wire-confining guide means about its periphery;

means for mounting the spool and transducer to one of two rectilinearly, relatively movable members;

first and second spaced support means mounted on the other of the two relatively movable members;

a length of wire tautly held at its opposite ends by said first and second spaced support means, respectively, and looped spirally at least one full time about the periphery of said spool within said guide means for converting rectilinear relative motion between said spool and said wire to rotary motion of said spool for driving said rotary transducer and;

means of flexible length for covering said wire between each of said support means and said spool during relative rectilinear movement between said support means and said spool.

* * * * *